(12) United States Patent
Somer et al.

(10) Patent No.: US 10,104,509 B2
(45) Date of Patent: Oct. 16, 2018

(54) METHOD AND SYSTEM FOR IDENTIFYING EXCEPTIONS OF PEOPLE BEHAVIOR

(71) Applicant: ANGEL SENSE LTD., Yehud (IL)

(72) Inventors: Doron Somer, Kadima (IL); Nery Ben-Azar, Yehud (IL)

(73) Assignee: ANGEL SENSE LTD, Yehud (IL)

(*) Notice: Subject to any disclaimer, the term of this patent is extended or adjusted under 35 U.S.C. 154(b) by 0 days.

(21) Appl. No.: 14/768,789

(22) PCT Filed: Feb. 18, 2014

(86) PCT No.: PCT/IL2014/050173
§ 371 (c)(1),
(2) Date: Aug. 19, 2015

(87) PCT Pub. No.: WO2014/128698
PCT Pub. Date: Aug. 28, 2014

(65) Prior Publication Data
US 2016/0007165 A1 Jan. 7, 2016

Related U.S. Application Data

(60) Provisional application No. 61/766,132, filed on Feb. 19, 2013.

(51) Int. Cl.
H04W 4/22 (2009.01)
H04W 4/029 (2018.01)
(Continued)

(52) U.S. Cl.
CPC ....... H04W 4/029 (2018.02); H04M 1/72569 (2013.01); H04W 4/028 (2013.01);
(Continued)

(58) Field of Classification Search
CPC .................................................. A61B 5/7285
See application file for complete search history.

(56) References Cited

U.S. PATENT DOCUMENTS

| 6,697,103 B1* | 2/2004 | Fernandez | G08B 13/19608 |
| | | | 348/143 |
| 2002/0016719 A1* | 2/2002 | Nemeth | G06Q 50/22 |
| | | | 705/2 |

(Continued)

Primary Examiner — Charles Appiah
Assistant Examiner — Frank Donado
(74) Attorney, Agent, or Firm — Browdy and Neimark, PLLC

(57) ABSTRACT

A method and system for identifying exceptions, of a person/child behavior through scheduled behavior, using a personal communication device having at least one sensor attached to person/child body which provide location data and motion data. The method includes sampling measurements data for each sensor of the personal communication device, identifying atomic pattern of sampled measurements, the atomic pattern representing basic behavior of the person/child, identify location in which person has spent time using a clustering algorithm, create activity segmentation characterized by location, schedule, caregiver, or content derived from sensors measurements and atomic patterns and analyzing characteristics changes or combination thereof of activities in sequenced/complex activities in comparison to baseline, to identify exception which indicate of at least one of the following: changes at activity level, changes at emotional arousal level, unknown locations or unexpected locations based on schedule.

5 Claims, 9 Drawing Sheets

(51) Int. Cl.
*H04W 4/90* (2018.01)
*H04W 4/02* (2018.01)
*H04M 1/725* (2006.01)
*H04W 84/18* (2009.01)

(52) U.S. Cl.
CPC ............... *H04W 4/22* (2013.01); *H04W 4/90* (2018.02); *H04W 84/18* (2013.01)

(56) References Cited

U.S. PATENT DOCUMENTS

| | | | | |
|---|---|---|---|---|
| 2005/0250440 A1* | 11/2005 | Zhou | ................. | G01S 5/0027 455/12.1 |
| 2006/0031101 A1 | 2/2006 | Ross | | |
| 2006/0085227 A1* | 4/2006 | Rosenfeld | ............ | G16H 50/20 705/2 |
| 2008/0084296 A1* | 4/2008 | Kutzik | ................ | G06F 19/3418 340/540 |
| 2008/0139899 A1* | 6/2008 | Student | ................ | A61B 5/1112 600/301 |
| 2009/0069642 A1* | 3/2009 | Gao | ................... | A61B 5/02055 600/300 |
| 2009/0264967 A1* | 10/2009 | Giftakis | ............. | A61N 1/36082 607/62 |
| 2010/0082301 A1 | 4/2010 | Skibiski et al. | | |
| 2010/0198622 A1* | 8/2010 | Gajic | ..................... | G06Q 50/22 705/3 |
| 2011/0004072 A1* | 1/2011 | Fletcher | ............... | A61B 5/0002 600/300 |
| 2011/0009760 A1* | 1/2011 | Zhang | ..................... | A61B 5/08 600/529 |
| 2011/0040155 A1* | 2/2011 | Guzak | ..................... | A61B 5/16 600/300 |
| 2013/0009783 A1* | 1/2013 | Tran | .................... | G06F 19/3418 340/669 |
| 2013/0035579 A1* | 2/2013 | Le | ........................ | A61B 5/0476 600/383 |
| 2013/0211291 A1* | 8/2013 | Tran | ..................... | G06F 19/3418 600/595 |
| 2013/0253291 A1* | 9/2013 | Dixon | .................... | A47C 21/00 600/323 |
| 2014/0030684 A1* | 1/2014 | Steinmetz | ................ | G09B 5/00 434/247 |
| 2015/0305689 A1* | 10/2015 | Gourmelon | ........... | A61B 5/002 600/301 |
| 2016/0338685 A1* | 11/2016 | Nawana | ................. | G16H 50/20 |

* cited by examiner

540 — Supervised Learning of Behaviors Classification by Emotion

5410 — Receiving information from guardian associating a specific pattern or a specific time interval with a specific emotion. E.g. telling that a head banging identifies stress, or that the entire last 5 minutes represent stressful behavior.

5420 — Applying algorithms to learn the typical behavior of the person/child representing each emotion using the information provided by the parent.

Figure 6

550 — Exception Identification and Reporting

5510 — Analyzing characteristics changes and ,irregular activities in sequence/complex activities in all level of activities hierarchies in comparison to (predefined rules/templates) baseline for identifying exceptions such as :changes at activity level, changes at emotional arousal level, unknown locations or unexpected locations based on schedule (such as Suspected Abuse in Transportation Event) longer transit routes, different transit routes (time series analysis )

5520 — Using predefined domain specific rules for determining reporting mechanism (daily report, weekly report, real-time notification using email/SMS/Notifications) based on: severity of exceptions, classifications determined in the supervised learning stage and user preferences 5530 — Allow guardian to perform inquiries based on exceptions, e.g. opening microphone or camera remotely for verifying person/child's status/reaction and optionally communicate with the person

Figure 7

70 Person Application

710 Generate a visual representation of schedules using web databases of pictures by location as well as pictures taken by caregivers.

720 Enable guardian to collect feedback from person

730 Potentially add person's reaction classification by parent into the activity analysis

Figure 8

80 — Caregiver Application

810 — Allow caregivers to input classifications of person state (e.g. stress level)

820 — Analyze and correlate caregivers classifications to activities to identify e.g. stressful activities.

Figure 9

METHOD AND SYSTEM FOR IDENTIFYING EXCEPTIONS OF PEOPLE BEHAVIOR

FIELD OF THE INVENTION

The present invention relates generally to the field of systems and methods for tracking, analyzing, and identifying exceptions in subject behavior and more particularly, to systems and methods for tracking, analyzing, and identifying exceptions in subject behavior through scheduled location based behavior.

BACKGROUND OF THE INVENTION

People with disabilities and in particular, those with communication and cognitive disabilities may experience great difficulties to express their feelings and emotions. The professional literature indicates that people with autism or other communication and cognitive disabilities are vulnerable and subjected to mistreatment and higher rates of violence and abuse (as compared to their peers without a disability). Hence, there is a need to ensure their personal safety and to develop tools that will allow their family members and service providers to have a better sense of their well-being.

SUMMARY OF THE INVENTION

The present invention provides a method for identifying exceptions, of a person behavior through scheduled behavior, using a personal communication device associated with least one sensor attached to a person body or garments which provides at least location data and/or motion data. The method comprising the steps of: sampling measurements data for each sensor associated with the person communication device, identifying atomic pattern of sampled measurements, said atomic pattern representing basic behavior of the person, identify locations in which the person has spent time using a clustering algorithm, create activity segmentation characterized by location, schedule, activity type, or content derived from sensors measurements and atomic patterns and analyzing characteristics changes or combination thereof of activities in sequenced/complex activities in comparison to given baseline, to identify exception which indicate of at least one of the following: changes at activity level, changes at emotional arousal level, unknown locations or unexpected locations based on schedule.

According to some embodiments of the present invention the method further comprising the step of creating visualization presentation of the scheduled location based on activity segmentation.

According to some embodiments of the present invention the method further comprising the steps of receiving sensor measurements received from communication device associated with a caregiver or person/child currently located in vicinity of the person/child and identifying correlations/association between different sensors measurements.

According to some embodiments of the present invention the method further comprising the steps of receiving data from environmental sensors.

According to some embodiments of the present invention the method further comprising the steps of receiving location based data from web based or external services.

According to some embodiments of the present invention the method further comprising the step of creating a hierarchical representation of activity sequences of time period with the same context.

According to some embodiments of the present invention the method further comprising the step of using schedule information provided by the guardian or other external sources to refine segmentation.

According to some embodiments of the present invention the method comprising the step of receiving information from guardian associating a specific pattern or a specific time interval with a specific emotion and applying algorithms to learn the typical behavior of the person representing each emotion using the information provided by the guardian.

According to some embodiments of the present invention the method the further comprising the step of using predefined domain specific rules for determining a reporting mechanism for sending an alert of behavior exceptions based on at least one of the following: severity of exceptions, classifications determined in the supervised learning stage and user preferences.

According to some embodiments of the present invention the method further comprising the step of providing the guardian with communication interface to perform inquiries based on exceptions.

According to some embodiments of the present invention the activities segmentation include classifying transits state between locations.

The present invention provides a system for identifying exceptions, of a person behavior through scheduled behavior. The system comprised of: a personal communication device having at least one sensor attached to person body which provide location data and/or motion data, said communication associated with a sensor processing module for sampling measurements data for each sensor of the personal communication device and identifying atomic pattern of sampled measurements, said atomic pattern representing basic behavior of the person and a sever including segmentation modules for identifying location in which the person has spent time using a clustering algorithm, creating activity segmentation characterized by location, schedule, caregiver, or content derived from sensors measurements and atomic patterns and Exception Identification module for analyzing characteristics changes or combination thereof of activities in sequenced/complex activities in comparison to given baseline, to identify exception which indicate of at least one of the following: changes at activity level, changes at emotional arousal level, unknown locations or unexpected locations based on schedule.

According to some embodiments of the present invention the system further comprising visualization presentation of the scheduled location based on activity segmentation.

According to some embodiments of the present invention the segmentation module further receives sensor measurements received from communication device associated with a caregiver or person currently located in vicinity of the person and identifies correlations/association between different sensors measurements.

According to some embodiments of the present invention the segmentation modules further receives data from environmental sensors.

According to some embodiments of the present invention the segmentation module further receives location based data from web based services.

According to some embodiments of the present invention the segmentation module further creates a hierarchical representation of activity sequences of time period with the same context.

According to some embodiments of the present invention the segmentation module further uses schedule information provided by the guardian or other external sources to refine segmentation.

According to some embodiments of the present invention the Exception Identification module further receives information from guardian associating a specific pattern or a specific time interval with a specific emotion and applying algorithms to learn the typical behavior of the person representing each emotion using the information provided by the guardian.

According to some embodiments of the present invention the Exception Identification module further uses predefined domain specific rules for determining a reporting mechanism for sending an alert of behavior exceptions based on at least one of the following: severity of exceptions, classifications determined in the supervised learning stage and user preferences.

According to some embodiments of the present invention the system further comprising communication interface for the guardian to perform inquiries based on exceptions. According to some embodiments of the present invention the segmentation module include classifying transits state between locations.

BRIEF DESCRIPTIONS OF THE DRAWINGS

The subject matter regarded as the invention will become more clearly understood in light of the ensuing description of embodiments herein, given by way of example and for purposes of illustrative discussion of the present invention only, with reference to the accompanying drawings, wherein FIG. 1 is a block diagram, schematically illustrating a system for tracking, analyzing, and identifying exceptions in subject behavior, according to some embodiments of the invention;

FIG. 6 is a flowchart, schematically illustrating a method for Supervised Learning of Behaviors Classification by Emotion, according to some embodiments of the invention;

FIG. 7 is a flowchart, schematically illustrating a method for Exception Identification and Reporting, according to some embodiments of the invention;

FIG. 8 is a flowchart, schematically illustrating a Person Application processing, according to some embodiments of the invention; and FIG. 9 is a flowchart, schematically illustrating Caregiver Application processing, according to some embodiments of the invention.

DETAILED DESCRIPTIONS OF SOME EMBODIMENTS OF THE INVENTION

Figure 1:
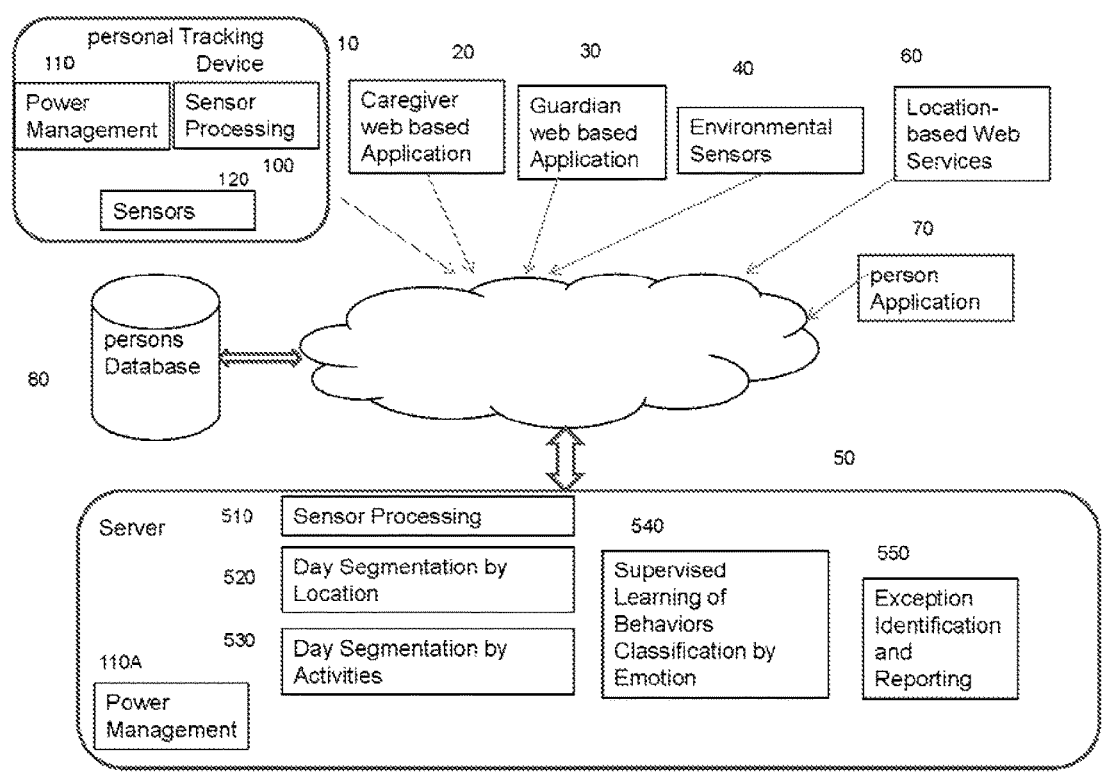

While the description below contains many specifications, these should not be construed as limitations on the scope of the invention, but rather as exemplifications of the preferred embodiments. Those skilled in the art will envision other possible variations that are within its scope. Accordingly, the scope of the invention should be determined not by the embodiment illustrated, but by the appended claims and their legal equivalents.

An embodiment is an example or implementation of the inventions. The various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "one embodiment", "an embodiment", "some embodiments" or "other embodiments" means that a particular feature, structure, or characteristic described in connection with the embodiments is included in at least one embodiments, but not necessarily all embodiments, of the inventions. It is understood that the phraseology and terminology employed herein is not to be construed as limiting and are for descriptive purpose only.

The principles and uses of the teachings of the present invention may be better understood with reference to the accompanying description, figures and examples. It is to be understood that the details set forth herein do not construe a limitation to an application of the invention. Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers. The phrase "consisting essentially of", and grammatical variants thereof, when used herein is not to be construed as excluding additional components, steps, features, integers or groups thereof but rather that the additional features, integers, steps, components or groups thereof do not materially alter the basic and novel characteristics of the claimed composition, device or method.

If the specification or claims refer to "an additional" element, that does not preclude there being more than one of the additional element. It is to be understood that where the claims or specification refer to "a" or "an" element, such reference is not be construed that there is only one of that element. It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks. The term "method" refers to manners, means, techniques and procedures for accomplishing a given task including, but not limited to, those manners, means, techniques and procedures either known to, or readily developed from known manners, means, techniques and procedures by practitioners of the art to which the invention belongs. The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined. The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

FIG. 1 is a block diagram, schematically illustrating a system for tracking, analyzing, and identifying exceptions in subject behavior, according to some embodiments of the invention. The system according to some embodiments of the present invention is comprised of at least one a Personal Tracking Device 10 for measuring behavior data of a Person, a server 50 for analyzing measured data and identifying exceptional behavior based on transmitted measured data, and Person database 80 for maintaining history of measured data and analyzed data. The system may be further be associated with one of the following information sources: Caregiver web based Application 20 for receiving location data and reports, Guardian web based Application 30, environmental Sensors 40 enabling to measure environment condition in vicinity of the Person, such as temperature or monitoring the environment using camera or microphone, location-based Web Services 60 for providing real-time data at the current position of the Person and/or personal application enabling to track in real-time the person behavior and provide feedback. The Personal Tracking Device 10 basic structure includes at least one of the following: location sensor such as GPS, motion sensor such an accelerator, and or microphone. Optionally the Personal Tracking Device 10 includes sensor processing module 100 for sampling, compressing, filtering and/or power management module 110. The server 50 may comprise: Sensor Processing 510 for analyzing atomic behavior pattern, Day Segmentation by Location 520 and Day Segmentation by Activities 530 for analyzing and identifying activities and their characteristics, Supervised Learning of Behaviors Classification by Emotion 540 enabling to classify behaviors using guardian or caregivers feedback and Exception Identification and Reporting module 550 for identifying exceptional behavior based on identified activities and their characteristics by comparing to predefined base line. The power management and sensor processing modules may be processed at the tracking device or at the server or in both locations.

According to some embodiments of the present invention the server may include management module for automatically controlling the personal tracking device sensors and modes of operation: such as listen-in mode or to 'ring' mode or to 'bi-directional call' mode or out of deep sleep mode and optionally defining settings of the device such as authorized numbers for listen-in or automatically setup geo-fences parameters.

Figure 2:
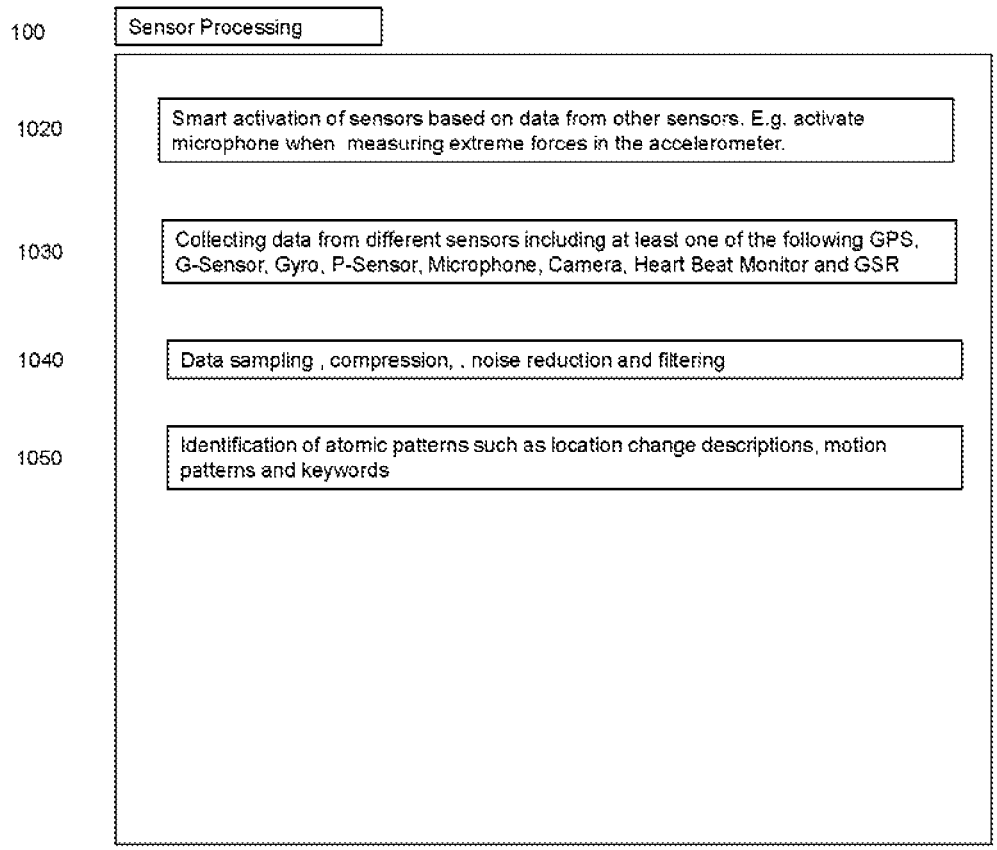
FIG. 2 is a flowchart, schematically illustrating a method for sensors processing, according to some embodiments of the invention.

FIG. 2 is a flowchart, schematically illustrating a method for sensors processing 100, according to some embodiments of the invention. The method includes: at least one of the following operations: Smart activation of sensors based on data from other sensors, (E.g. activate microphone when measuring extreme forces in the accelerometer 1020), Collecting data from different sensors 1030, Data sampling, compression, filtering noise reduction and filtering 1040 and or identification of atomic patterns such as location change descriptions, motion patterns and keywords 1050.

The sensor of the tracking device may include at least one of the following: GPS, G-Sensor, Gyro, P-Sensor, Microphone, Camera, Heart Beat Monitor, blood pressure and GSR (Galvanic Skin Sensor).

The compression and filter processes may include one of the following actions:

For GPS sensor, accumulating of readings and sending measurements at changing frequencies based on activity, eliminating redundant GPS locations (same location) and incremental representation of the GPS readings (send an initial full GPS location and then only the differences), optionally transmitting only meaningful atomic motion patterns and not the raw data.

Acceleration sensor: sampling of specific actual movements such as steps (pedometer) hand flapping, head banging, stretching skin etc. as well as some overall summary characteristics of movement (e.g. an indication of level of activity per minute).

Microphone eliminating data below a certain volume and eliminating data where no human sound was detected, identifying keywords.

Noise reduction may include, implementing noise reduction such as, GPS spikes elimination, smoothing and noise reduction can be done over the raw acceleration samples (imply unreasonable speed).

For Arousal sensors: sending only significant readings representing arousal over a certain level and/or sending summary data. E.g. averages readings over a number of seconds, heartbeat variability over a number of seconds, etc.

Identification of atomic patterns is performed by analyzing real time basic behavior pattern, comparing to known pattern templates of classified action such as walking, hand clapping, etc.

Figure 3:
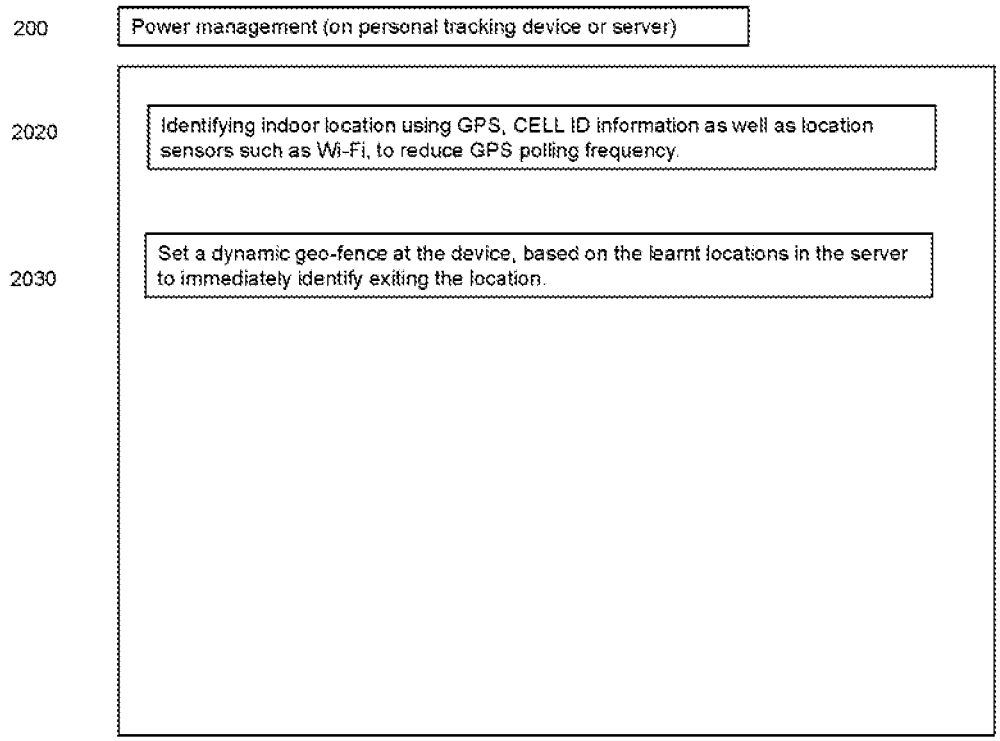
FIG. 3 is a flowchart, schematically illustrating a method of Power Management, according to some embodiments of the invention.

FIG. 3 is a flowchart, schematically illustrating a method of Power Management 200, according to some embodiments of the invention. This method may include one of following steps: Identifying indoor location using GPS, CELL ID information as well as location information of network communication elements such as Wi-Fi or Bluetooth transmitters, to reduce GPS data transmission frequency 2020 and/or Set a dynamic geo-fence at the device, based on the learnt locations in the server to immediately identify exiting the location 2030.

The system according to some embodiments of the present invention uses learning algorithms to detect information regarding locations in which the person/child spends time in. The location information may include parameters such as the boundaries of the location for defining a geo-fence alert.

Optionally the system of the present invention uses supervised data from the guardian or caregiver for providing meaningful names/tags to identified locations.

Once identifying a child/person, entering a location which is identified by name, the server automatically uses the history data aggregated by the learning algorithm related to this location for dynamically setting a geo-fence range which can be used at the personal device to generate alerts. The personal device may send GPS data once identifying the person/child is out of the geo-fence range.

The geo-fence range may be dependent on multiple parameters, including the aggregated history of GPS data or other communication element (such as Bluetooth) accumulated by the learning algorithm and the history of GPS errors.

Figure 4:
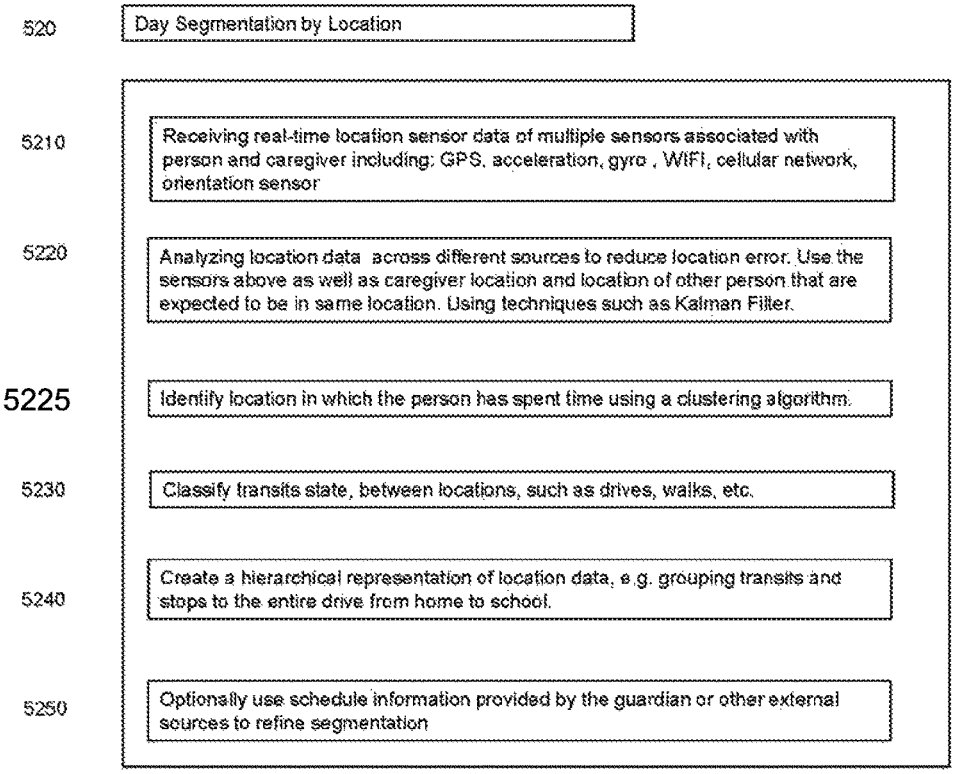
FIG. 4 is a flowchart, schematically illustrating a method for Day Segmentation by Location, according to some embodiments of the invention.

FIG. 4 is a flowchart, schematically illustrating a method for Day Segmentation by Location 520, according to some embodiments of the invention. This method may include one of following steps: Receiving real-time location sensor data of multiple sensors associated with a person carrying personal tracking device and caregiver including: GPS, acceleration, gyro, WIFI, Bluetooth, cellular network, orientation sensor 5210, analyzing location data across different sources to reduce location error and improve its accuracy 5220, Identify location in which the Person has spent time using a clustering algorithm 5225, (the location can be identified by type such as school, park, home and/or by specific names of places), Classifying transits state between locations such drives, walks, etc. 5230, and create an hierarchical representation of location data by context, e.g. grouping transits and stops to the entire drive from home to school 5240.

The analysis of location data include checking caregiver location and location of other Persons that are expected to be in same location. The analysis may applied by using techniques such as Kalman Filter.

According to some embodiments of the present invention, the location can be refined by associating the location data to the schedule of the Persons based on given schedule by the guardian, other external sources or learned scheduled 5250.

Figure 5:
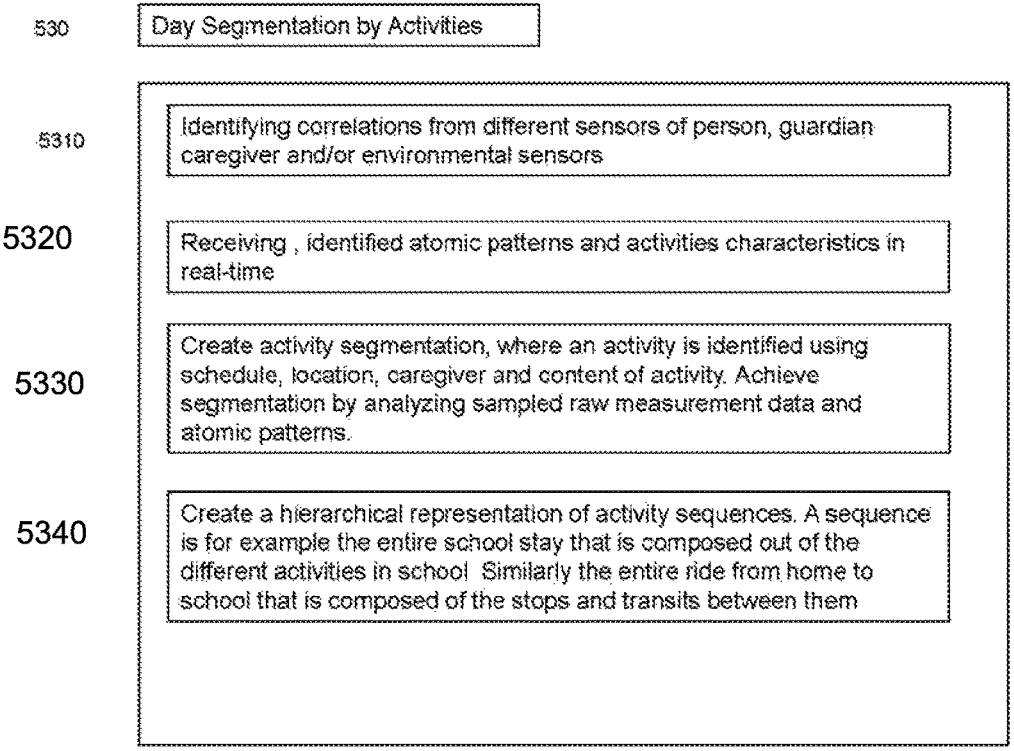
FIG. 5 is a flowchart, schematically illustrating a method for Day Segmentation by Activities, according to some embodiments of the invention.

FIG. 5 is a flowchart, schematically illustrating a method for Day Segmentation by Activities 530, according to some embodiments of the invention. This method may include one of following steps: Identifying correlations from different sensors of person/child, guardian caregiver and/or environmental sensors 5310, Receiving, identified atomic patterns and activities characteristics in real-time 5320, Creating activity segmentation, where an activity is identified by analyzing schedule, location, and/or caregiver and/or content of activity 5330 and/or Creating a hierarchical representation of activity sequences 5340.

According to some embodiments of the present invention the segmentation is achieved by analyzing sampled raw measurement data and atomic patterns.

The hierarchical representation may include a sequence of activities of time period with the same context, for example the entire school stay that is composed out of the different activities in school or the entire ride from home to school that is composed of the stops and transits between them.

FIG. 6 is a flowchart, schematically illustrating a method for Supervised Learning of Behaviors Classification by Emotion 540, according to some embodiments of the invention. This method includes at least one of the following steps: Receiving information from guardian associating a specific pattern or a specific time interval with a specific emotion 5410 and/or Applying algorithms to learn the typical behavior of the person/child representing each emotion using the information provided by the parent 5420. The received information may include, indicating that a head banging identifies stress, or that the entire last 5 minutes represent stressful behavior.

FIG. 7 is a flowchart, schematically illustrating a method for Exception Identification and Reporting 550, according to some embodiments of the invention. The method includes at least one of the following steps: Analyzing characteristics changes and/or irregular activities in sequence/complex activities in all level of activities hierarchies in comparison to (predefined rules/templates) baseline 5510, using predefined domain specific rules for determining reporting mechanism 5520, and allow guardian to perform inquiries based on exceptions 5530, e.g. opening microphone or camera remotely for verifying person/child's status/reaction and optionally communicate with the person/child.

The characteristics analysis enable to identify exceptions such as: changes at activity level, changes at emotional arousal level, unknown locations or unexpected locations based on schedule (such as Suspected Abuse in Transportation Event) longer transit routes, different transit routes. The exception analysis may be performed using time series analysis techniques.

The reporting mechanism may include at least one of the following: daily report, weekly report, real-time notification using email/SMS/Notifications.

The predefined domain specific rules may be based on at least one of the following: severity of exceptions, classifications determined in the supervised learning stage and user preferences.

FIG. 8 is a flowchart, schematically illustrating a Person Application processing 70, according to some embodiments of the invention. The person application may perform at one of the following: Generate a visual representation of the day scheduled segments by location or by activities, using pictures of locations or activities retrieved from web databases as well as pictures taken by caregiver or guardian 710, enable guardian to collect feedback from the person 720 and or potentially add person/child's reaction classification by parent into the activity analysis 730.

FIG. 9 is a flowchart, schematically illustrating Caregiver Application processing 80, according to some embodiments of the invention. The Caregiver application may perform the following: Allow caregivers to report on the person activities (e.g. eating, medical taking, physical activities) input classifications of Person state (e.g. stress level) 810 and/or Analyze and correlate caregivers classifications to activities to identify e.g. stressful activities 820.

The invention claimed is:

1. A method of remotely monitoring the emotional state of a cognitively disabled patient, using a personal communications computing device associated with at least a location data sensor, a motion data sensor, and a microphone attached to the patient's body or garments, said method comprising the steps of:

sampling measurements from the location and motion data sensors;

identifying atomic patterns of the sampled motion measurements and identifying a time and a geographic location in which the atomic patterns are detected by analyzing real time basic behavior pattern and comparing the identified time and geographic location of the atomic pattern to known pattern templates of classified action;

receiving and storing in a computer readable storage medium information indicative of typical behavior from a guardian associating at least one specific atomic pattern or at least one specific time interval with at least one specific emotion of the cognitively disabled patient, the received information identifying stress from the atomic pattern or indicating the specific interval represents stressful behavior;

using a clustering algorithm generated by computer-implemented supervised learning to classify activity segments in real time characterized by the location, the time, and the stored information received from the guardian, the classification resulting in at least a first activity segment characterized by a first location and a second activity segment characterized by a second location, the first and second locations being different from one another;

comparing at least one of characteristics changes and irregular activities in the classified activity segments with a baseline to identify an exception indicating an emotional state;

responsively to identifying the exception, activating the microphone and sampling input from the microphone to identify one or more keywords related to the cognitively disabled patient provided by the guardian; and responsively to the identification of the one or more keywords, reporting an emotional arousal alert.

2. The method of claim 1 further comprising the step of sending an alert indicating a severity of the exception.

3. The method of claim 1 wherein the activity segmentation further includes classifying transitions between locations.

4. A system for remotely monitoring the emotional state of a cognitively disabled patient, the system comprising a personal communications computing device associated with at least a location data sensor, a motion data sensor, and a microphone attached to the patient's body or garments, the system configured to perform the steps of:

sampling measurements from the location and motion data sensors;

identifying atomic patterns of the sampled motion measurements and identifying a time and a geographic location in which the atomic patterns are detected by analyzing a real-time basic behavior pattern and comparing the identified time and geographic location of the atomic pattern to known pattern templates of classified actions;

receiving and storing in a computer readable storage medium information indicative of typical behavior from a guardian associating at least one specific atomic pattern or at least one specific time interval with at least one specific emotion of the cognitively disabled patient, the received information identifying stress from the atomic pattern or indicating the specific interval represents stressful behavior;

using a clustering algorithm generated by computer-implemented supervised learning to classify activity segments in real time characterized by the location, the time, and the stored information received from the guardian, the classification resulting in at least a first activity segment characterized by a first location and a second activity segment characterized by a second location, the first and second locations being different from one another;

comparing at least one of characteristics changes and irregular activities in the classified activity segments with a baseline to identify an exception indicating an emotional state;

responsively to identifying the exception, activating the microphone and sampling input from the microphone to identify one or more keywords related to the cognitively disabled patient provided by the guardian; and responsively to the identification of the one or more keywords, reporting an emotional arousal alert.

5. The system of claim 4, wherein the personal communications computing device is further configured for sending an alert indicating a severity of the exceptions.

* * * * *